Patented Apr. 3, 1923.

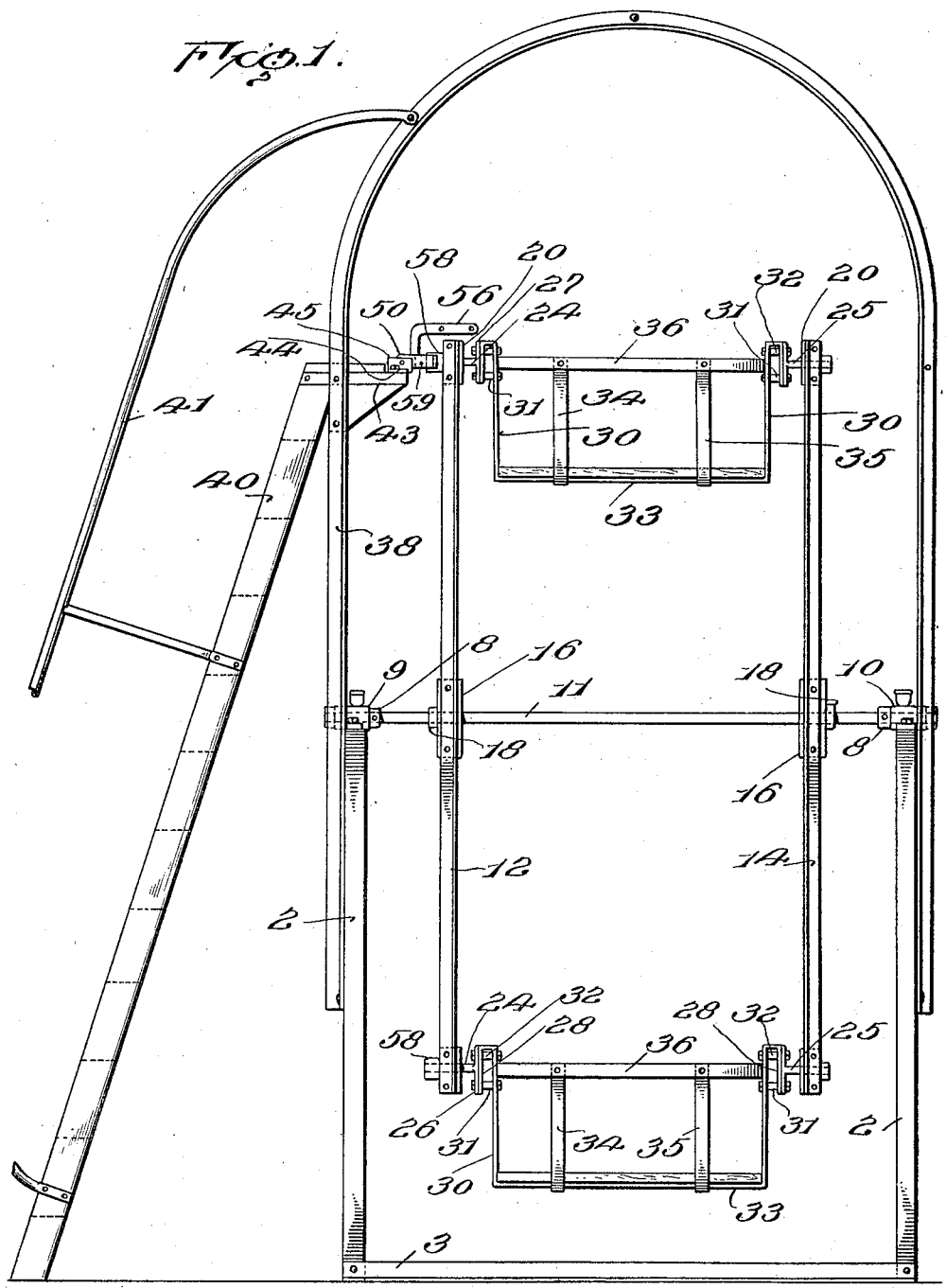

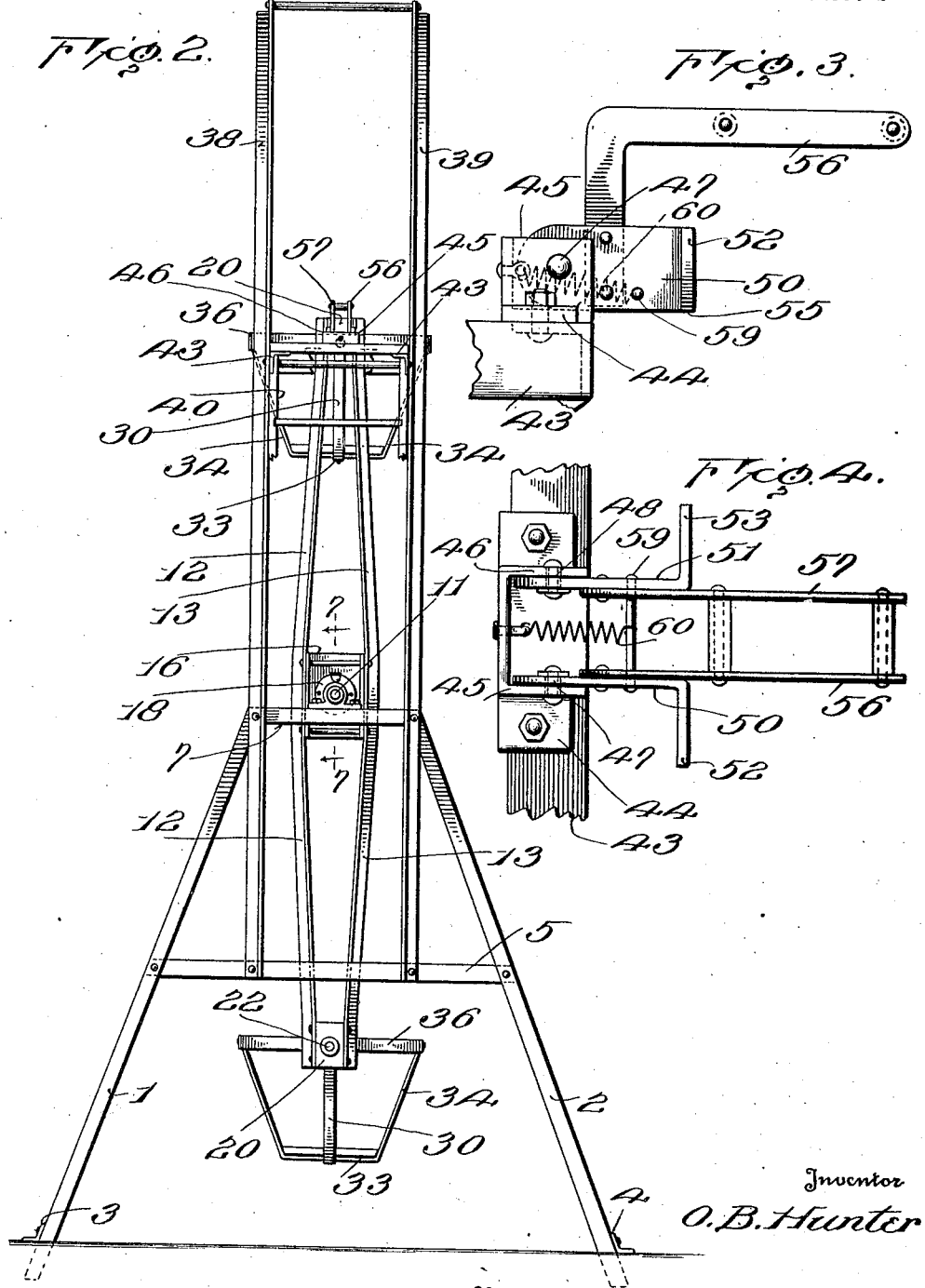

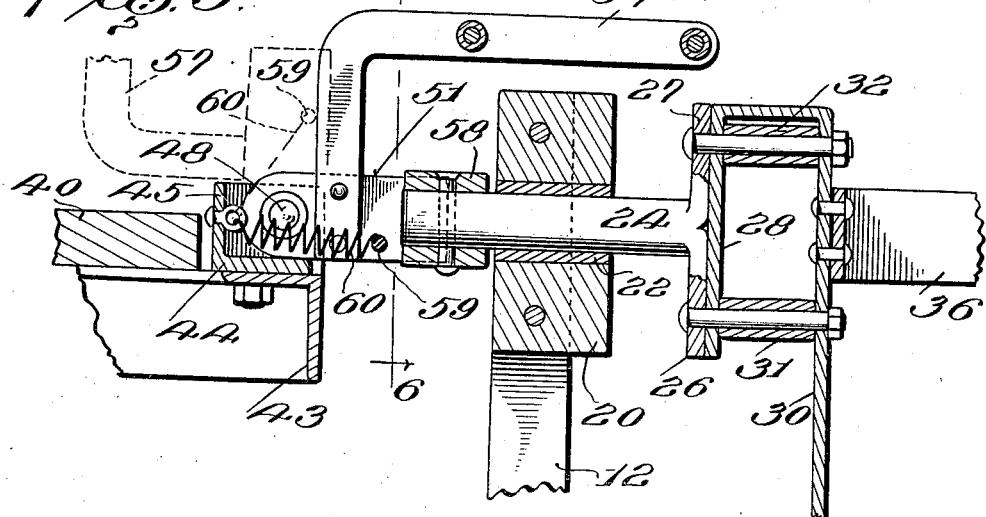

1,450,634

UNITED STATES PATENT OFFICE.

OMER B. HUNTER, OF CHICKASHA, OKLAHOMA.

AMUSEMENT DEVICE.

Application filed December 15, 1921. Serial No. 522,530.

*To all whom it may concern:*

Be it known that I, OMER B. HUNTER, a citizen of the United States, residing at Chickasha, in the county of Grady, State of Oklahoma, have invented certain new and useful Improvements in Amusement Devices, of which the following is a description, reference being had to the accompanying drawing, and to the figures of reference marked thereon.

This invention relates to amusement devices and more particularly to rotating passenger wheels or carriers for children.

The principal object of this invention resides in providing a movable carrier having seats for passengers, constructed and arranged so that the passengers themselves propel the carrier.

Another object of this invention resides in providing a device of the character described comprising a movable carrier having a plurality of seats or the like which, during at least a portion of the movement of the carrier, are sufficiently close to the ground so as to enable the occupants therein to propel the carrier by contact of their feet with the ground.

Another feature of this invention resides in providing a seat containing wheel or other movable carrier, in which the seats are moved successively relatively close to the ground and then away from the ground so that each occupant can propel the carrier by means of his feet, whereby the occupants in the other seats are traveled through the air.

Yet another feature of this invention resides in providing a wheel or the like movable about a horizontal axis but not necessarily in a circular path, and containing seats spaced thereabout, which seats, during movement of the structure, approach sufficiently near the ground during part of their travel to permit the propulsion of the structure by the feet of the occupant of a seat.

A further feature of this invention resides in providing a novel means for loading seats from a plurality of stations.

Still another aim of the invention is to provide a locking means for locking the structure at rest for taking on and discharging passengers.

Still another feature of this invention resides in the means where the lock is automatically thrown to an out of the way position in case the lock is inadvertently thrown into locking position during the travel of the frame.

A further phase of the invention resides in the provision of a simple, cheap and commercial form of apparatus of the character described.

These and other objects will in part be obvious from a perusal of the following specification when taken in connection with the accompanying drawings, in which Figure 1 is a front elevation of the device;

Figure 2 is a side view thereof;

Figure 3 is a detail perspective view of the locking means for the frame;

Figure 4 is a plan view thereof;

Figure 5 is a view showing the lock in position;

Figure 6 is a view on the line 6—6 of Fig. 5; and

Figure 7 is a view on the line 7—7 of Fig. 2.

In general, the invention comprises a framework or carrier provided with a plurality of seats. The carrier is constructed and arranged to be moved so that the seats move in a predetermined path near the ground during at least a portion of their travel, so that the occupants of the seats can successively propel the carrier by contact of their feet with the ground. The invention broadly includes a substantially horizontal travel of the carrier as well as vertical. Means are provided for loading and unloading the carrier and for locking it against movement at these times.

In the specific embodiment of the invention illustrated in the drawings, the device comprises a base frame having two pairs of uprights 1, 2, preferably inclined inwardly and forming the four corner supports. These uprights are braced by lateral lower cross bars 3, 4; by cross bars 5 at their mid-portions, and by lateral pairs of cross bars 7 and 8 at their upper portions, thereby providing a firm cheap standard or base support. Preferably all the members are of metal stock, but they may be of wood where extreme cheapness is desired. The cross bars 7 and 8 are provided with bearings 9 and 10 for opposite ends of a shaft 11 upon which the rotating frame revolves.

This rotating frame may be of any desired shape or construction. In the present instance, it is disclosed as composed of two pairs of side bars 12, 13, and 14, which gradually taper together toward their outer ends. Centrally the pairs of bars are bolted to cross plates 16, which are provided with circular spiders 18 fastened rigidly to the shaft 11. In this manner the parallel frame members revolve with the axle. At their outer ends the parallel frames are joined by further cross plates 20 formed with bearings 22 for short axles 24 and 25 carrying the swinging seats.

As shown clearly in Figure 5, the inner end of each of these short shafts are formed with lateral ears or plates 26 and 27, to which are bolted bent over ears or flanges 28 integral with the main frames 30 of the seats. Suitable spacing and strengthening tubes 31 and 32 surround the bolts between the bent portions of these flanges 28 and 29. At the bottom the main frames are somewhat broad to provide seat boards 33. In order to prevent the occupants from accidentally falling out, the seat frames are provided with front and rear straps 34 and 35 and also a top strap 36, the latter being riveted to the main seat frame, and the former being riveted to the bottom seat boards and the top strap 36.

By means of the foregoing construction, the seats will swing freely on their axles 24 and 25 as the frame revolves on the central axle 11.

While the carrier or seats may be loaded entirely from the ground, it is desirable to simultaneously load it from the top as well as from the ground. To this end, the frame is provided with two parallel uprights 38 and 39 which extend from the cross bars 5, to which they are bolted upwardly.

To this end the base frame is provided with an arbor shaped upper frame formed of two parallel bars 38 and 39, which arch over the rotating frame and are suitably bolted to the lower and upper cross bars 5 and 6 and 7 and 8. A ladder 40 extends from the ground upwardly and is bolted to the side portions of these arbor shaped bars 38 and 39 at a point abreast of the uppermost position of the traveling seats, as shown in Figure 1. For convenience, a suitable railing 41 is fastened to the ladder and to the upper bowed portions of the bars 38 and 39.

At the junction of the ladder and the spaced upright portions 38 and 39, the spaced uprights 38 and 39 or the ladder are or is provided with an inwardly projecting platform 43, on which the locking mechanism is carried exactly opposite the loading position of the seat. The lock permits the rotating frame to be held rigidly during the loading and unloading interval. This platform is in turn provided with a detachable plate 44 having spaced upright ears 45 and 46 to which is pivoted, as at 47, a swinging lock comprising spaced inwardly projecting lugs 50 and 51, in turn formed with laterally extending flanges 52 and 53, provided with curved cam faces 54 and 55. Preferably, the swinging lock is formed with a handle consisting of two L-shaped rods 56 and 57 riveted to the sides of the inwardly projecting lugs 50 and 51. This handle projects inwardly near the seat so that it can be operated readily by the occupant. The locking lugs 50 and 51 are spaced so that they will straddle a square shaped block 58 secured to the outer end of the short shaft 24. Below the pivotal axis 47, 48 of the swinging lugs 50 and 51 is a cross pin 59 to which is fastened one end of a coiled spring 60, the other end being anchored to a portion of the frame in the same horizontal plane or higher plane than the plane of the axis 47, 48. This in effect constitutes a sort of toggle spring which operates to hold the swinging lugs 50, 51 in lowered position when they are so positioned, yet quickly shifts the lugs to a raised position, as in Figure 5, when the lugs are swung slightly upwardly, as is well known. The purpose of the cam faces 54 and 55 of the lateral flanges 52 and 53 of the swinging lugs 50 and 51 must now be evident. In case the locking member is inadvertently swung to inward locking position, while the rotating seat frame is revolving, the blocks 58, or other desired portion of the rotating frame, if desired will strike the curved cam surfaces and will throw the lugs upwardly to an out of the way position as in Figure 5. This is a very simple and effective means for preventing injury not only to the occupants of the seats but also to the device itself.

It is evident that the invention is not restricted to the exact design of carrier shown or in the manner of mounting the seats, or to the number of seats. Neither is it desired to restrict the invention to the specific location or type of locking means. This is an additional safeguard. It is also clear that the terms of the claims are not restricted to a symmetrically shaped carrier, such as the present one, in which the seat swing always in a circular path; the path of travel may be readily arranged to suit, by changing the shape of the traveling frame and its manner of travel about the rotating axle 11. In fact, various modifications will readily occur to those skilled in the art and all such embodiments are within the contemplation of this invention provided they come within the terms of the appended claims.

Having thus described my invention, what I claim as new and desire to secure by Letters Patent, is:

1. A device of the class described comprising a support, a movable frame carried thereby, seats on said frame, said frame and seats being constructed and arranged so that said seats travel in continuous succession in a predetermined fixed path toward and away from the ground on movement of said frame, a portion of the path of travel of said seats being relatively close to the ground whereby the occupants of said seats can propel the frame by means of their feet engaging the ground.

2. A device of the class described comprising a support, a frame movably journaled on a horizontal axis on said support, a plurality of seats on said frame adapted to travel around said axis and in said travel to approach sufficiently close to the ground so that the occupants thereof can propel said frame by means of their feet on the ground.

3. A device of the class described comprising a support, a movable frame carried thereby, seats spaced symmetrically on said frame and adapted to travel in a continuous path in the vertical plane and during such travel to approach sufficiently close to the ground to permit said frame to be propelled by the feet of the occupants on the ground, a platform arranged on said support for receiving or discharging passengers as they move into uppermost position.

4. A device of the class described comprising a support, a rotatable frame journaled on a horizontal axis thereon, seats spaced on said frame and adapted to approach sufficiently close to the ground on rotation of said frame to permit said frame to be propelled by the feet of the occupants on the ground, and a platform arranged on said support to permit the loading and discharging of occupants into and from the seats as they move into a predetermined position, and a locking device located on said support at a point accessible to the passengers in said seats for locking said frame from movement.

5. A device of the class described comprising a support, a frame mounted thereon for rotation in a vertical plane, seats carried in symmetrically spaced relation on said frame, a locking device mounted on said support, said locking device being constructed to project into the path of and to engage a portion of said rotatable frame to lock the same from rotation, said device being further constructed and arranged to be thrown out of the path of said frame by the travel of said frame when said lock is not in locking engagement therewith.

6. A device of the class described comprising a support, a traveling frame mounted to rotate thereon, seats carried by said frame, a lug on said frame, a locking member pivotally mounted on said support and swingable into and out of locking engagement with said lug, a spring adapted to retain said locking member in either locked or unlocked position, said locking member having a cam surface adapted to be contacted by said frame to shift said locking member to permit the spring to shift the same.

7. A device of the class described comprising a support, a horizontal axle thereon, a frame comprising spaced side bars symmetrically journaled on said axle for rotation thereabout in a vertical plane, a plurality of seats pivotally journaled in symmetrical spaced relation on said side bars and adapted to travel relatively close to the ground to enable the occupants of said seats to propel the frame with their feet on the ground.

8. A device of the class described comprising a support, a central horizontal axle, a frame comprising spaced side bars rotatably journaled intermediate their ends on said axle, swinging seats disposed between the spaced ends of said side bars and pivotally journaled thereto so that on rotation of said frame said seats will travel successively sufficiently close to the ground to enable the occupants thereof to propel the frame by means of their feet on the ground.

In testimony whereof, I affix my signature.

OMER B. HUNTER.